(12) United States Patent
Ricketts et al.

(10) Patent No.: US 8,747,195 B2
(45) Date of Patent: Jun. 10, 2014

(54) UNLOADER SYSTEM FOR AN AGRICULTURAL COMBINE

(71) Applicant: CNH America LLC, New Holland, PA (US)

(72) Inventors: Jonathan Eugene Ricketts, Coal Valley, IL (US); Kevin Scott Richman, Plainfield, IL (US); Robert A Matousek, Valley Center, KS (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/674,550

(22) Filed: Nov. 12, 2012

(65) Prior Publication Data

US 2014/0135083 A1 May 15, 2014

(51) Int. Cl.
*A01D 17/02* (2006.01)
*A01F 12/46* (2006.01)

(52) U.S. Cl.
USPC .......................................... 460/114; 414/519

(58) Field of Classification Search
CPC ............... A01D 41/1217; A01D 41/12; A01D 41/1208; A01D 90/10; A01D 43/073; A01D 43/087; A01F 12/442; B65G 65/46
USPC ............ 460/114, 45, 100; 414/526, 528, 502, 414/808, 505, 343, 519, 520; 198/550; 208/552
See application file for complete search history.

(56) References Cited

U.S. PATENT DOCUMENTS

| | | | |
|---|---|---|---|
| 2,625,001 A | 1/1953 | Heun | |
| 2,706,371 A | 4/1955 | Bishop | |
| 2,788,487 A | 4/1957 | Grogg | |
| 3,162,003 A | 12/1964 | Schapansky | |
| 3,339,758 A | 9/1967 | Hubert et al. | |
| 3,348,706 A | 10/1967 | Hyman | |
| 3,365,086 A | 1/1968 | Young | |
| 3,580,257 A | 5/1971 | Teague | |
| 3,680,291 A | 8/1972 | Soteropulos | |
| 4,067,343 A | 1/1978 | Muijs et al. | |
| 4,100,720 A * | 7/1978 | Carnewal et al. | 56/14.6 |
| 4,257,215 A | 3/1981 | Maher et al. | |
| 5,496,215 A * | 3/1996 | Underwood et al. | 460/114 |
| 5,957,773 A * | 9/1999 | Olmsted et al. | 460/7 |

(Continued)

FOREIGN PATENT DOCUMENTS

| | | |
|---|---|---|
| FR | 1376108 A | 10/1964 |
| FR | 2126702 A5 | 10/1972 |
| JP | 2011160708 | 8/2011 |
| JP | 2012095565 A * | 5/2012 |

*Primary Examiner* — Árpád Fábián-Kovács
(74) *Attorney, Agent, or Firm* — Patrick M. Sheldrake

(57) ABSTRACT

An agricultural combine with a plurality of grain tanks and an unloader system for unloading grain harvested by the combine. The unloader system has an unloader tube, a sensor and a controller. The unloader tube includes an interior passageway with a conveyor inside the interior passageway for moving the grain through the unloader tube and at least two discharge assemblies on the unloader tube for discharging grain traveling through the unloader tube to one of the plurality of grain tanks. The sensor is used for sensing an attribute of the grain that is to be unloaded through the unloader tube. The controller is operatively connected to and in communication with the unloader system and sensor so as to discharge the grain from the unloader tube through one of the at least two discharge assemblies based upon the attribute detected by the sensor.

16 Claims, 4 Drawing Sheets

(56) References Cited

U.S. PATENT DOCUMENTS

| | | |
|---|---|---|
| 7,198,449 B2 | 4/2007 | Dillon |
| 7,584,836 B2 * | 9/2009 | McCully et al. .............. 198/671 |
| 7,644,816 B2 * | 1/2010 | Veiga Leal et al. ........... 198/671 |
| 7,938,613 B2 * | 5/2011 | Yoder et al. ................... 414/518 |
| 8,045,168 B2 * | 10/2011 | Missotten et al. ............ 356/445 |
| 8,265,837 B2 * | 9/2012 | Ricketts et al. ................. 701/50 |
| 8,366,372 B2 * | 2/2013 | Yoder et al. ................... 414/518 |
| 8,435,104 B2 * | 5/2013 | Dillon .......................... 460/100 |
| 2009/0151313 A1 | 6/2009 | Dillon |
| 2009/0290970 A1 * | 11/2009 | Farley et al. .................. 414/808 |
| 2010/0009731 A1 | 1/2010 | Coers |
| 2012/0024670 A1 * | 2/2012 | Koerselman et al. ......... 198/671 |

* cited by examiner

UNLOADER SYSTEM FOR AN AGRICULTURAL COMBINE

BACKGROUND OF THE INVENTION

The present invention relates generally to an agricultural combine having an unloader system. In particular, the present invention relates to an agricultural combine having an unloader system with an unloader tube configured to discharge into one of a plurality of grain tanks.

Conventional unloader systems allow for grain harvested by agricultural combines to be delivered to a single grain location, such as a grain tank onboard the combine. Grain can then be offloaded from the combine into separate containers not onboard the combine for transport. However, conventional unloader systems have a few operational drawbacks. For example, the harvested grain must be delivered to a single grain location on the combine and then later, when the tank is full, moved to a new location. This method increases the amount of time it takes to unload grain and thus increases the amount of time and resources that must be spent in the field harvesting the grain. Further, all of the grain harvested ends up in the same single grain tank and further separation of the grain may be needed based on various attributes of the grain, which then involves a subsequent process.

Thus, there is still a need for an agricultural combine unloader system that is capable of addressing the aforementioned problems of conventional agricultural combines. Such a need is satisfied by the agricultural combine unloader system of the present invention.

BRIEF SUMMARY OF THE INVENTION

In a first aspect, the present invention provides an agricultural combine that includes a first grain tank, a second grain tank and an unloader system. The unloader system includes an unloader tube, a sensor and a controller. The unloader tube includes an interior passageway, a conveyor extending along the interior passageway for conveying grain through the unloader tube, a first discharge opening, a first discharge assembly adjacent the first discharge opening, a second discharge opening and a second discharge assembly adjacent the second discharge opening, wherein the first discharge opening discharges grain traveling through the unloader tube to the first grain tank and the second discharge opening discharges grain traveling through the unloader tube to the second grain tank. The sensor senses an attribute of the grain harvested by the combine. The controller is operatively connected to and in communication with the unloader system and the sensor. The controller is configured to discharge the grain from the unloader tube to one of the first and second grain tanks based upon the attribute of the grain detected by the sensor.

In a second aspect, the present invention provides a method of discharging grain on an agricultural combine that includes providing a plurality of grain tanks, providing an unloader tube having a conveyor, a plurality of openings and a plurality of discharge assemblies moveable between open and closed positions, providing a sensor for determining an attribute of grain being unloaded through the unloader tube and providing a controller operatively connected to and in communication with the sensor and the plurality of discharge assemblies on the unloader tube. The controller is configured to move one of the plurality of discharge assemblies to the open position based upon a detected attribute of the grain by the sensor for depositing the grain within one of the plurality of grain tanks.

In a third aspect, the present invention provides an agricultural combine that includes a first grain tank, a second grain tank proximate the first grain tank and an unloader system. The unloader system includes an unloader tube, a sensor and a controller. The unloader tube has an interior passageway and a conveyor extending along the interior passageway for conveying grain through the unloader tube. The unloader tube further includes a first discharge opening, a first discharge assembly adjacent the first discharge opening that includes a first cover movable between a closed position for covering the first discharge opening and an open position wherein the first cover is spaced from the first discharge opening, a second discharge opening, and a second discharge assembly adjacent the second discharge opening that includes a second cover movable between a closed position for covering the second discharge opening and an open position wherein the second cover is spaced from the second discharge opening. The first discharge opening discharges grain traveling through the unloader tube to the first grain tank and the second discharge opening discharges grain traveling through the unloader tube to the second grain tank. The sensor senses an attribute of the grain harvested by the combine. The controller is operatively connected to and in communication with the first and second discharge assemblies and the sensor. The controller is also configured to discharge the grain from the unloader tube to one of the first and second grain tanks based upon the attribute of the grain sensed by the sensor.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain," "tailing," and "crop material" are used throughout the specification for convenience and it should be understood that these terms are not intended to be limiting. Thus, "grain" refers to that part of a crop which is harvested and separated from discardable portions of the crop material.

Figure 1:
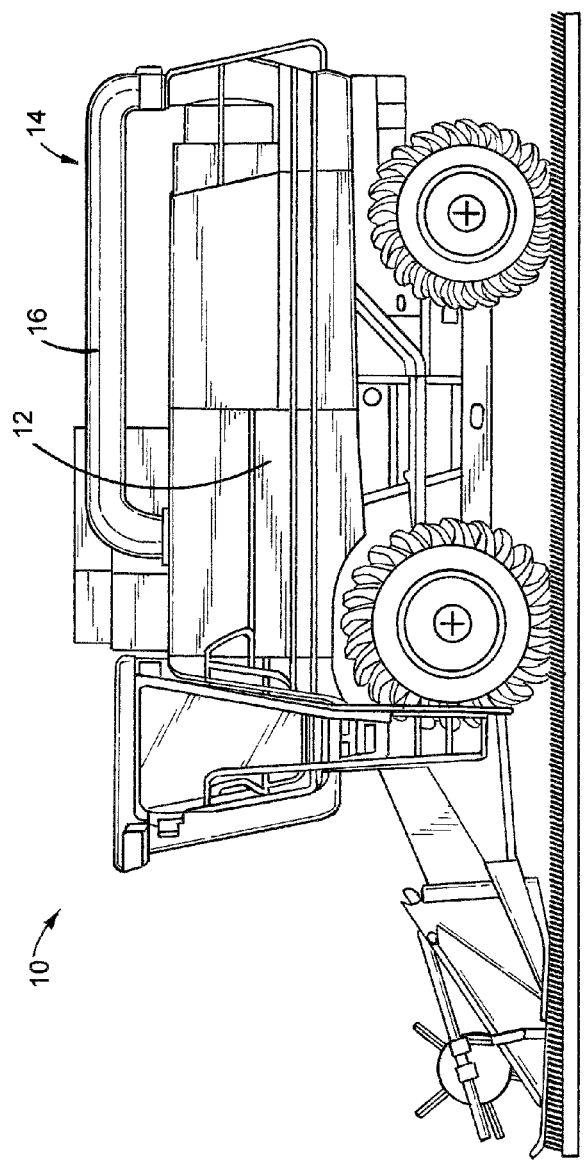
FIG. 1 is an elevation view of an agricultural combine with an unloader system in accordance with a first preferred embodiment of the present invention.
Figure 5:
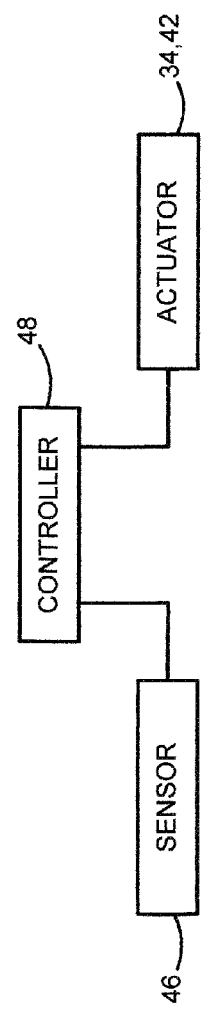
FIG. 5 is a schematic block diagram of a control system in accordance with a preferred embodiment of the present invention.
Figure 2:
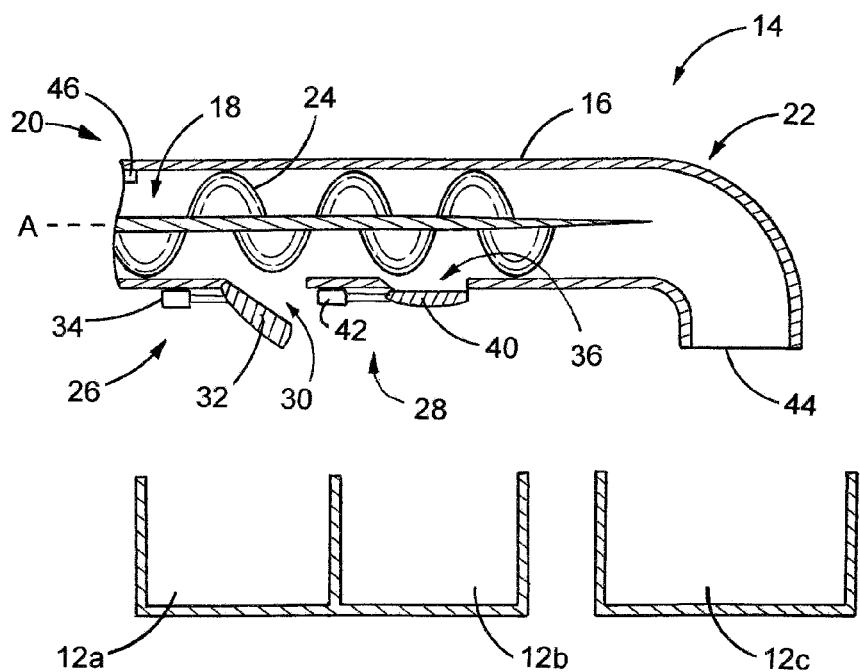
FIG. 2 is a partial, side, cross-sectional view of an unloader tube in accordance with a preferred embodiment of the present invention.

Referring to FIGS. 1, 2 and 5, in a preferred embodiment, the present invention provides an agricultural combine 10 having a plurality of grain tanks 12, such as a first grain tank 12a and a second grain tank 12b, an unloader system 14, a sensor 46 and a controller 48.

The agricultural combine 10 includes a body supported by wheels and an engine (not shown) for driving the wheels to allow the agricultural combine 10 to move from place to place within the field. An operator's station is positioned towards the forward end of the agricultural combine 10 and includes controls to allow the operator to adjust the functions of the agricultural combine 10. Such features of an agricultural combine 10 are known in the art and a detailed description of their structure, function and operation is not necessary for a complete understanding of the present invention.

At the forward end of the agricultural combine 10 is a grain harvesting header that severs and gathers the grain material from the field. After harvesting the grain materials or collecting the grain materials, the grain materials are fed rearward through a feeder housing to the combine's internal threshing system (not shown). The threshing system then separates the grain from the unwanted crop residue. Because the present invention is applicable to a variety of different threshing systems and because threshing systems are generally well-known to those skilled in the art, a detailed discussion of the structure, function and operation of such threshing systems is not necessary for a complete understanding of the present invention. After the threshing system has separated the grain from the crop residue, the grain is transferred to the unloader system 14, which is used to load grain on to the combine's grain tanks and to offload grain from the grain tanks e.g., to off-machine grain tanks.

In a preferred embodiment, the agricultural combine 10 has two separate grain tanks, the first grain tank 12a and the second grain tank 12b. However, the combine 10 can be configured with more than two grain tanks, such as three, four, five, or more separate grain tanks. As shown in FIG. 2, the grain tanks 12a, 12b are located onboard the agricultural combine 10. Alternatively, some or all of the grain tanks e.g., grain tank 12c, can be located off-machine on a grain trailer. The grain trailer is a detached trailer that can travel in tandem with the agricultural combine 10 and which is capable of leaving the combine to empty its payload when at full capacity. Configuring one or more grain tanks 12a, 12b, 12c to be located on-machine and/or off-machine allows for the combine 10 to maximize efficiency when harvesting the grain.

Referring to FIGS. 1 and 2, the unloader system 14 includes an unloader tube 16. The unloader tube 16 includes an interior passageway 18, a conveyor 24 extending through the interior passageway 18 and at least a first discharge assembly 26 and a second discharge assembly 28. The interior passageway 18 has a proximal end 20 and a distal end 22 opposite the proximal end 20 and extends completely through the unloader tube 16 so as to provide a passageway for the conveyance of grain therethrough. The proximal end 20 is the end of the unloader tube directly connected to the combine.

The interior passageway 18 has an annular body with a circular cross-section. Alternatively, the interior passageway 18 can be configured to have a cross-section perpendicular to a longitudinal axis A of the unloader tube 16 of any suitable shape, such as, but not limited to a square cross-section, an oval cross-section, a triangular cross-section, or a hexagonal cross-section. Further, the unloader tube 16 can be an open-topped unloader tube. That is, the open-topped unloader tube can have a substantially "U" shaped cross-section or be of a planar configuration with side walls.

As shown in FIG. 2, located within the interior passageway 18 is a conveyor 24. The conveyor 24 is preferably a screw auger conveyor 24, but can alternatively by any conveyor capable of moving grain through the unloader tube 16, such as a paddle system, a conveyor belt, a pressure based system, or any combination thereof. A drive mechanism, such as a motor (not shown) powers the conveyor 24.

The unloader tube 16 includes a first discharge opening 30 positioned about a mid portion of the unloader tube 16 and at a bottom side of the unloader tube 16. The first discharge opening 30 is sized and shaped to allow for a continuous flow of grain traveling through the unloader tube 16 to discharge therethrough. In other words, the first discharge opening 30 is positioned about the outer periphery of the unloader tube 16 to discharge into the first gain tank 12a when the unloader tube 16 is positioned in a fixed predetermined discharge position. The fixed predetermined discharge position is a position that allows grain to be discharged in the first grain tank 12a from the first discharge opening 30 and into the second grain tank 12b from the second discharge opening 36 when in the fixed position. It is understood that the fixed discharge position is determined with respect to the position of the first grain tank 12a and the second grain tank 12b.

The first discharge assembly 26 includes a first cover 32 moveable between an open position and closed position. The first cover 32 is sized and shaped to allow the first cover 32 to completely cover the first discharge opening 30, so as to prevent the outflow of grain from the first discharge opening 30 when the cover is in the closed position. Alternatively, the first cover 32 can be configured slightly larger than the first discharge opening 30 so as to have a partial or complete overlapping edge of the first cover 32 when covering the first discharge opening 30. In the open position, the first cover 32 is spaced from the first discharge opening 30 to allow for a flow grain to travel through the first discharge opening 30.

Figure 2A:
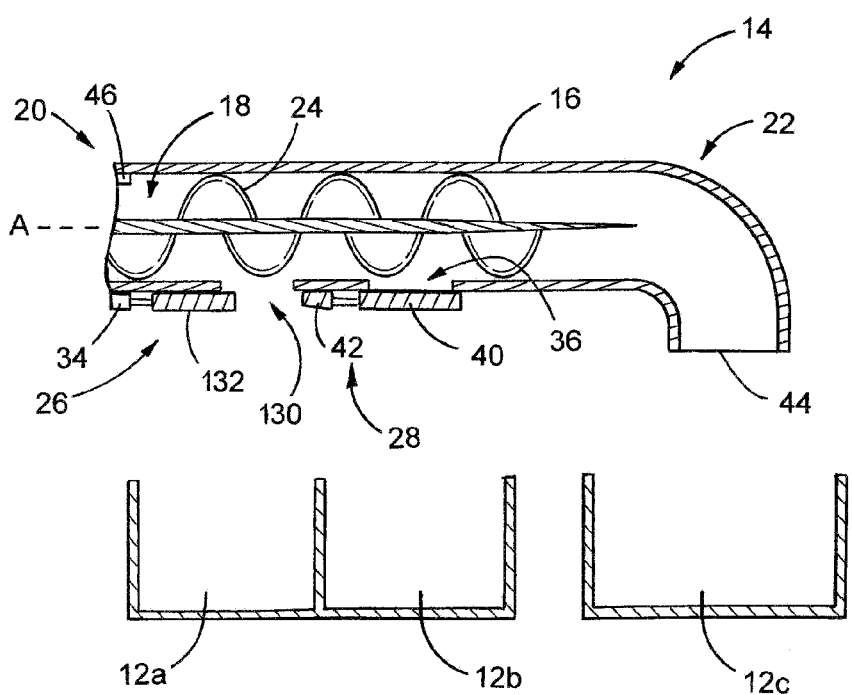
FIG. 2A is a partial, side, cross-sectional view of an unloader tube in accordance with another aspect of the present invention.

Preferably, the first cover 32 is pivotably attached to the unloader tube 16 so as to pivot between open and closed positions. Further, the first discharge assembly 26 includes an actuator 34 that moves the cover 32 between the open and closed positions. The actuator 34 can alternatively be any other means capable of moving the cover 32 between the open and closed positions. For example, the means to move the cover 32 between the open and closed positions can be a cylinder, a hydraulic actuator, an electric actuator, a motor, or a manually operable lever. Furthermore, the first cover 32 can alternatively be configured as a sliding cover 132 that slides relative to the outer surface of the unloader tube 16 between open and closed positions for covering and uncovering the first opening 130, as shown in FIG. 2A.

As shown in FIG. 2, the actuator 34 is located along the external bottom surface of the unloader tube 16. Alternatively, the actuator 34 can be located anywhere along the unloader tube 16 as long as the actuator 34 is connected to and in communication with the controller 48 and can move the cover 32 between the open and closed positions.

When in a closed position, the first cover 32 engages and completely covers the first discharge opening 30 and does not allow any grain to flow out of the unloader tube 16 at the first discharge opening 30 (i.e., the cover covers the discharge opening to prevent the flow of grain from passing through the discharge opening). As a result, the grain either discharges from the second discharge opening 36 or continues along the unloader tube 16 so as to discharge from a third discharge opening 44 formed about the distal end 22 of the unloader tube 16, as best shown in FIG. 2. When the first cover 32 is in the open position, grain can freely flow out of the first discharge opening 30 located about the midsection of the unloader tube 16 and enter the first grain tank 12*a*. Further, when the first cover 32 is in the open position, grain is prevented from traveling further downstream the unloader tube for discharge through the second and third discharge openings.

The second discharge assembly 28 includes a second cover 40 moveable between open and closed positions. The second discharge assembly 28 is configured similar to the first discharge assembly 26, but is positioned downstream of the first discharge assembly 26 and upstream of the third discharge opening 44. Positioning the second discharge assembly 28 downstream the first discharge assembly 26 advantageously allows for the unloader tube 16 to discharge grain in either the first tank 12*a* or the second tank 12*b* positioned adjacent to the first tank 12*a*.

Figure 3:
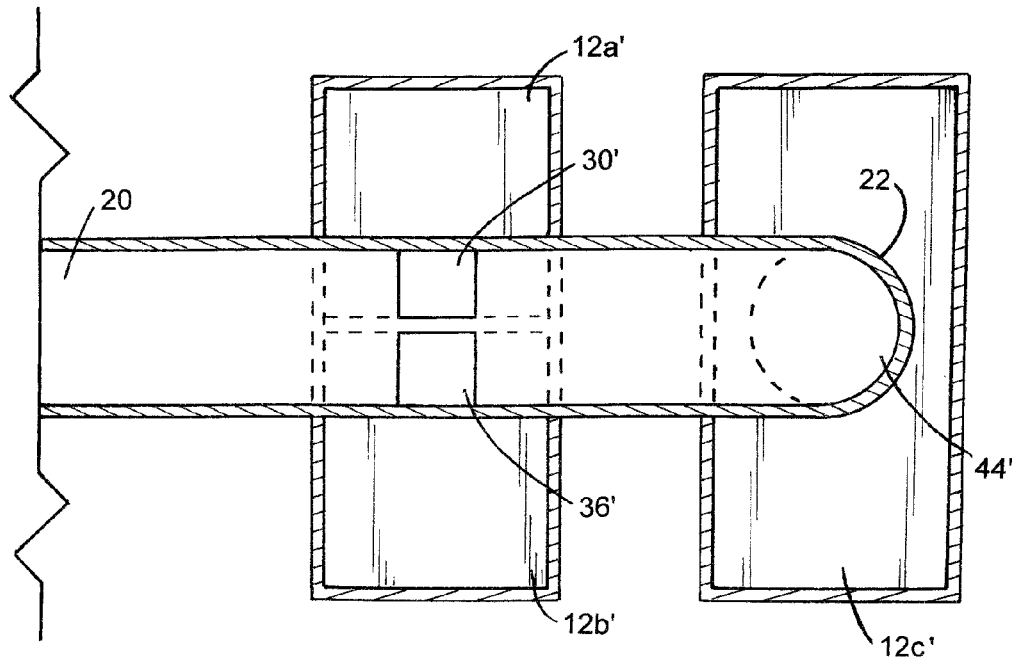
FIG. 3 is a partial, plan, cross-sectional view of the unloader tube in accordance with a second preferred embodiment of the present invention.

Alternatively, as shown in FIG. 3, the first and second discharge openings 30', 36' can be positioned adjacent each other in a side by side or medial/lateral configuration, as opposed to one being positioned downstream from the other. In this configuration, the first and second grain tanks 12*a'*, 12*b'* are configured in a side by side configuration to allow for grain discharging from the first discharge opening 30' to discharge into the first tank 12*a'* and grain discharging from the second discharge opening 36' to discharge into the second tank 12*b'*. That is, in this configuration the unloader tube 16 is positioned to extend substantially parallel to a wall separating the first grain tank 12*a* and the second grain tank 12*b* (i.e., the predetermined discharge position for the unloader tube 16 is aligned with the wall separating the grain tanks). The first and second discharge openings 30', 36' have corresponding first and second discharge assemblies similar to the first and second discharge assemblies 26, 28.

Figure 4:
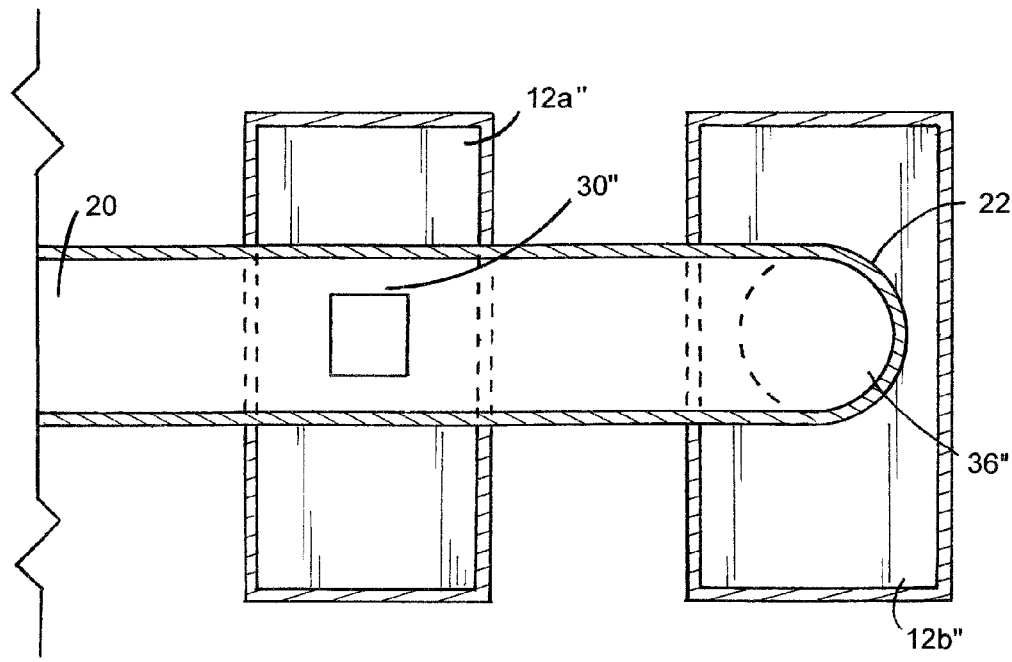
FIG. 4 is a partial, plan, cross-sectional view of the unloader tube in accordance with a third preferred embodiment of the present invention.

In an alternative embodiment, as shown in FIG. 4, the unloader tube 16 includes a first discharge opening 30" and a first discharge assembly (not shown) located about a midpoint of the unloader tube 16 and second discharge opening 36" located about the distal end 22 of the unloader tube 16. This configuration allows grain to be deposited to a first grain tank 12*a"* located on-machine and a second grain tank 12*b"* located off-machine. The first discharge assembly of the present embodiment can be configured similarly to the first discharge assembly 26.

Referring now to FIG. 5, the agricultural combine 10 includes the sensor 46 and a controller 48 in communication with the sensor 46. The sensor 46 detects an attribute of the grain harvested by the combine, such as protein content, moisture content, mass of material other than grain, size, density, color or any combination thereof. The sensor 46 can be any sensor known in the art and capable of detecting one or more attributes of grain. Additionally, the agricultural combine 10 can include a plurality of sensors 46 for detecting a plurality of attributes in the grain.

The sensor 46 can be located at any position of the combine 10 where it contacts with or operatively engages with the grain. Preferably, the sensor 46 is positioned at a location before the grain enters the unloader tube 16 or within the unloader tube 16 as long as the grain passes the sensor 46 before reaching the discharge openings 30, 36, or 44. The sensor 46 is also configured to intermittently or continuously monitor one or more attributes of the grain.

The controller 48 can be any controller readily known in the art, such as a computer, logic controller, or part of the combine's onboard control system. The controller 48 is operatively connected to in and communication with both the sensor 46 and the discharge assemblies 26, 28. Preferably, the controller 48 is operatively connected to and in communication with the actuators 34, 42 of the first and second discharge assemblies 26, 28. The controller 48 functions to actuate the actuators 34, 42 to move the covers 32, 40 of the first and second discharge assemblies 26, 28 between open and closed positions for covering and uncovering the first and second openings 30, 36.

In operation, the agricultural combine 10 intakes harvested grain through a cleaning process, removes waste and captures the grain. The processed grain is then conveyed to the unloader system 14 located on the agricultural combine 10. The unloader system's proximal end 20 is linked to the internal workings of the agricultural combine 10 and connected to receive the grain. As the grain enters the unloader system 14 the grain passes adjacent to the sensor 46, which is configured to detect an attribute of the grain, such as moisture content.

The controller 48 receives attribute information of the grain from the sensor 46 and then determines which of the first, second and third discharge openings 30, 36, 44 to discharge the grain through. After the controller 48 determines which discharge opening to discharge the grain through, the controller 48 actuates the appropriate actuator 34, 42 to open either cover 32 or 40 of the first and second discharge assemblies 26, 28 or maintain the covers 32 and 40 in the closed position, so as to force the grain to discharge from the third discharge opening 44. The controller 48 determines which grain tank to discharge into based upon a predetermined specification of the on-machine grain tank or off-machine grain tank.

In other words, the controller 48, after receiving information about the grain from the sensor 46, makes a decision on which of the plurality of grain tanks e.g., 12*a*, 12*b*, 12*c* the grain should end up being deposited in. If the grain is going to be deposited into the on-machine first grain tank 12*a* then the controller 48 sends an "open" signal to the actuator 34 of the first grain opening assembly 26. The actuator 34 then proceeds to move the cover 32 to an open position, as shown in FIG. 2, so the first discharge opening 30 is free from encumbrances and grain can exit the interior passageway 18 and freely flow into the on-machine first grain tank 12*a*.

Depending upon the attribute monitored by the sensor 46, the unloader system 14 can be configured to switch operations so as to unload into another grain tank, such as the second grain tank 12*b*. That is, e.g., when the sensor 46 detects that the attribute has reached a critical point, such as moisture content above a predetermined amount, the controller 48 is configured to close the first discharge assembly 26 and open the second discharge assembly 28 so as to discharge grain into the second grain tank 12*b*.

If, after receiving information about the grain from the sensor 46, the controller 48 determines that the grain must be deposited in the third grain tank 12*c* located off-machine, then the controller 48 sends a "close" signal to the actuators 34, 42 to close both the first and second discharge assemblies 26, 28. When the covers 32, 40 are in the closed position, the grain continues to flow along the interior passageway 18 via the conveyor 24 so as to reach the distal end 22 of the interior passageway 18 and discharge out of the third discharge opening 44 and be deposited into the off-machine grain tank 12c.

In a preferred embodiment, the unloader system 14 is positioned above the agricultural combine 10 so that the first discharge opening 30 and second discharge opening 36 are positioned above the first grain tank 12a and the second grain tank 12b, respectively. If it is determined, based upon the attributes found in the grain by the sensor 46 that the grain must be discharged off-machine, then the unloader system 14 can rotate the unloader tube 16 so as to position the third discharge opening 44 above the off-machine grain tank 12c. The off-machine grain tank 12c may be located to the rear of the agricultural combine 10 or on either side of the agricultural combine 10.

Figure 6:
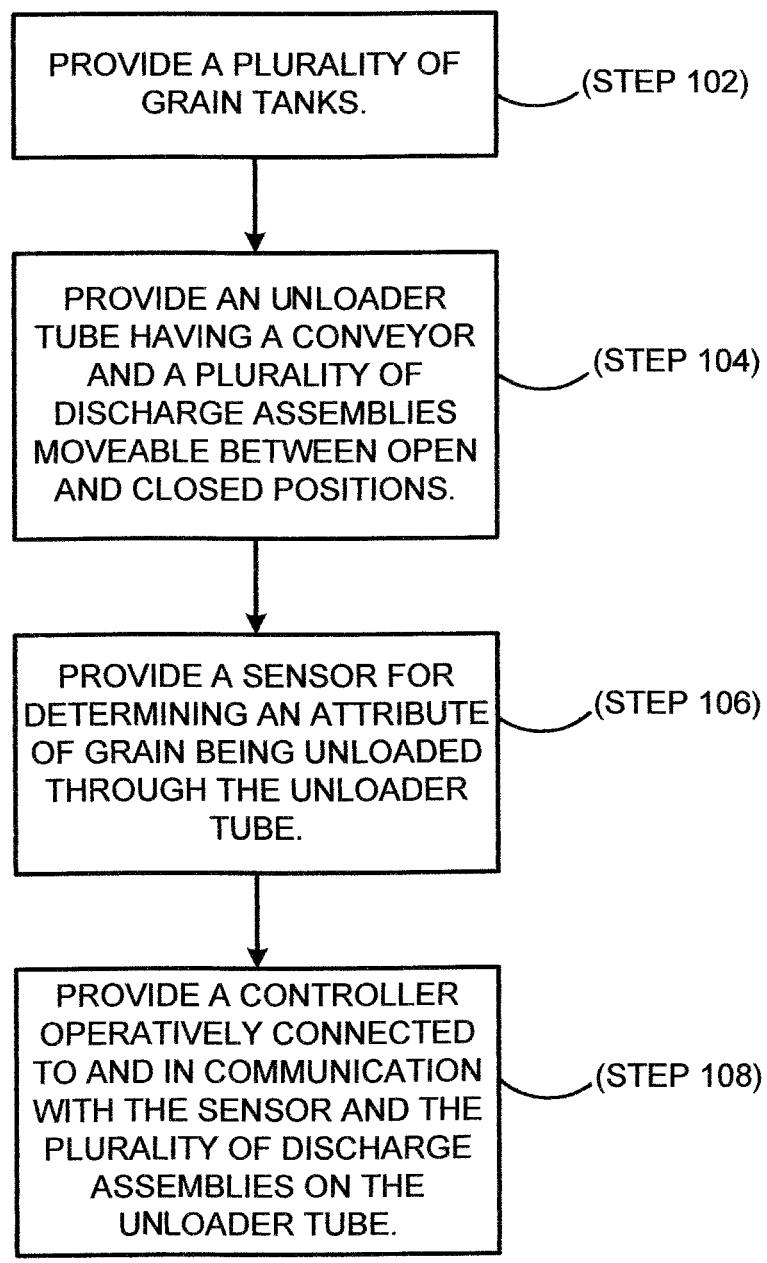
FIG. 6 is a flowchart of a method in accordance with another preferred embodiment of the present invention.

Referring to FIG. 6, in accordance with another preferred embodiment, the present invention provides a method of discharging grain 100. The method includes the step of providing a plurality of grain tanks 12a, 12b, 12c as described in any of the above embodiments (Step 102) and providing an unloader tube 16 having a conveyor 24 and a plurality of discharge openings 30, 36 and a plurality of corresponding discharge assemblies 26, 28 for covering and uncovering the discharge openings 30, 36 (Step 104). The method further includes providing at least one sensor 46 for determining an attribute of the grain being unloaded through an unloader tube 16 (Step 106). Further, the method includes providing a controller 48 operatively connected to and in communication with the sensor 46 and the plurality of discharge assemblies 26, 28 on the unloader tube 16 (Step 108). The controller 48 is configured to open one of the plurality of discharge assemblies 26, 28 based upon a detected attribute of the grain by the sensor 46 for depositing the grain within one of the plurality of grain tanks 12a, 12b, 12c.

It will be appreciated by those skilled in the art that changes could be made to the embodiments described above without departing from the broad inventive concept thereof. For example, additional components and steps can be added to the various discharge assemblies and grain tanks. It is to be understood, therefore, that this invention is not limited to the particular embodiment disclosed, but it is intended to cover modifications within the spirit and scope of the present invention as defined by the appended claims.

We claim:

1. An agricultural combine comprising:
   a first grain tank;
   a second grain tank; and
   an unloader system for unloading grain harvested by the combine, the unloader system including:
   an unloader tube having:
   an interior passageway,
   a conveyor extending along the interior passageway for conveying grain through the unloader tube,
   a first discharge opening,
   a first discharge assembly adjacent the first discharge opening,
   a second discharge opening, and
   a second discharge assembly adjacent the second discharge opening,
   wherein the first discharge opening discharges grain traveling through the unloader tube to the first grain tank and the second discharge opening discharges grain traveling through the unloader tube to the second grain tank;
   a sensor for sensing an attribute of the grain harvested by the combine; and
   a controller operatively connected to and in communication with the unloader system and the sensor, wherein the controller is configured to discharge the grain from the unloader tube to one of the first and second grain tanks based upon the attribute of the grain detected by the sensor.

2. The agricultural combine of claim 1, wherein the conveyor is a screw auger, a paddle system, conveyor belt or combination thereof.

3. The agricultural combine of claim 1, wherein the attribute is protein content, moisture content, material other than grain, size, density, color or a combination thereof.

4. The agricultural combine of claim 1, wherein the first and second grain tanks are an on-machine grain tank or an off-machine grain tank.

5. The agricultural combine of claim 4, wherein the first and second discharge openings are positioned about a midsection of the unloader tube, and wherein the unloader tube further includes a third discharge opening about a distal end of the unloader tube.

6. The agricultural combine of claim 1, wherein the first and second discharge assemblies each include a cover movable between an open position and a closed position.

7. The agricultural combine of claim 6, wherein in the open position, the cover is spaced from the discharge opening to allow for a flow grain through the discharge opening, and wherein in the closed position, the cover covers the discharge opening to prevent the flow of grain from passing through the discharge opening.

8. The agricultural combine of claim 6, wherein the cover is moveable by at least one of an actuator, a hydraulic cylinder and a motor.

9. A method of discharging grain on an agricultural combine comprising:
   providing a plurality of grain tanks;
   providing an unloader tube having a conveyor, a plurality of openings and a plurality of discharge assemblies moveable between open and closed positions for covering and uncovering the plurality of openings;
   providing a sensor for determining an attribute of grain being unloaded through the unloader tube; and
   providing a controller operatively connected to and in communication with the sensor and the plurality of discharge assemblies,
   wherein the controller is configured to move one of the plurality of discharge assemblies to the open position based upon a detected attribute of the grain by the sensor for depositing the grain within one of the plurality of grain tanks.

10. The method of claim 9, wherein the conveyor is a screw auger, a paddle system, a conveyor belt or a combination thereof.

11. The method of claim 9, wherein the attribute of grain is protein content, moisture content, mass of material other than grain, size, density, color or a combination thereof.

12. The method of claim 9, wherein the plurality of grain tanks are on-machine or off-machine.

13. The method of claim 12, wherein the unloader tube includes two discharge assemblies about a midsection of the unloader tube, and wherein the unloader tube further includes a third discharge opening about a distal end of the unloader tube.

14. The method of claim 9, wherein the discharge assemblies each include a cover movable between open and closed positions.

15. The method of claim 9, wherein the cover is moveable by at least one of an actuator, a hydraulic cylinder and a motor.

16. An agricultural combine comprising:
- a first grain tank;
- a second grain tank proximate the first grain tank; and
- an unloader system for unloading grain harvested by the combine, the unloader system including:
  - an unloader tube having:
    - an interior passageway,
    - a conveyor extending along the interior passageway for conveying grain through the unloader tube,
    - a first discharge opening,
    - a first discharge assembly adjacent the first discharge opening that includes a first cover movable between a closed position for covering the first discharge opening and an open position wherein the first cover is spaced from the first discharge opening,
    - a second discharge opening, and
    - a second discharge assembly adjacent the second discharge opening that includes a second cover movable between a closed position for covering the second discharge opening and an open position wherein the second cover is spaced from the second discharge opening,
    - wherein the first discharge opening discharges grain traveling through the unloader tube to the first grain tank and the second discharge opening discharges grain traveling through the unloader tube to the second grain tank;
- a sensor for sensing an attribute of the grain harvested by the combine; and
- a controller operatively connected to and in communication with the first and second discharge assemblies and the sensor, wherein the controller is configured to discharge the grain from the unloader tube to one of the first and second grain tanks based upon the attribute of the grain sensed by the sensor.

* * * * *